(12) United States Patent
Moore et al.

(10) Patent No.: US 6,664,925 B1
(45) Date of Patent: Dec. 16, 2003

(54) METHOD AND SYSTEM FOR DETERMINING THE LOCATION OF A MOBILE COMPUTER

(75) Inventors: Timothy M. Moore, Bellevue, WA (US); Joseph Polastre, Berkeley, CA (US); Warren Barkley, Mill Creek, WA (US); Paramvir Bahl, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/137,912

(22) Filed: May 2, 2002

(51) Int. Cl.[7] .................................................. G01S 3/02
(52) U.S. Cl. .................... 342/451; 342/450; 342/463
(58) Field of Search .............................. 342/463, 450, 342/451

(56) References Cited

U.S. PATENT DOCUMENTS 5,765,107 A * 6/1998 Korowajczuk .............. 455/410
6,272,541 B1 8/2001 Cromer et al.
6,327,535 B1 12/2001 Evans et al.

OTHER PUBLICATIONS

Kishan et al., *Halibut: An Infrastructure for Wireless LAN Location–Based Services*, Standard University (Jun. 2001).
Small et al., Determining User Location For Context Aware Computing Through the Use of a Wireless LAN Infrastructure, Institute for Complex Engineered Systems, Carnegie Mellon University www.cs.cmu.edu/~aura/docdir/small00.pdf (Dec. 2000).

Bahl, et al., RADAR: An In–Building RF–based User Location and Tracking System, Proceedings of IEEE Infocom, Tel Aviv, Israel, 775–784, (Mar. 2000).

* cited by examiner

Primary Examiner—Theodore M. Blum
(74) Attorney, Agent, or Firm—Leydig, Voit & Mayer, Ltd.

(57) ABSTRACT

A mobile computer establishes a wireless communication session with a wireless access point of a computer network. The location of each wireless access point is known and obtainable either from a database on the network or from the access points themselves. The strengths of wireless signals passing between the mobile computer and multiple wireless access points of the network, including the access point with which the mobile computer has established the session are measured at multiple time intervals. The measurements may be taken at the mobile computer itself or at the wireless access points. The measured strength values are then weighted according to such factors as whether the mobile computer has already established a communication session with the access point from which the sample was taken, and how old the sample is. For each location, the weighted strength values obtained for access points in that location are summed. The location having the highest sum is deemed to be the location of the mobile computer.

33 Claims, 5 Drawing Sheets

METHOD AND SYSTEM FOR DETERMINING THE LOCATION OF A MOBILE COMPUTER

TECHNICAL FIELD

The invention relates generally to using wireless signals to determine location and, more particularly, to using wireless signals to locate a mobile computer.

BACKGROUND OF THE INVENTION

Many organizations today operate their own internal computer networks. Wireless communication is increasingly an important part of such networks. The advantages of wireless communication is that it allows a user to be mobile, and, for example carry his notebook or handheld computer from room to room and from building to building while maintaining connectivity to the organization's network. The mobile user's computer typically communicates with the network through a series of wireless access points distributed throughout the organization's facility.

There are many applications in which determining the location of a mobile user is useful. For example, if an employee of a large corporation needs to print out a document, but finds himself in an unfamiliar building, he will have to walk around looking for the nearest printer and, once he finds it, determine the printer's network name and select the printer on his screen. It would be very useful for the employee if he could simply send the document to "the nearest printer," have the network identify the nearest printer, automatically send the document there, and give directions to the user as to how to get to the printer.

SUMMARY OF THE INVENTION

The invention is generally directed to a method and system for determining the location of a mobile computer, in which the mobile computer establishes a wireless communication session with a wireless access point of a computer network. According to various embodiments of the invention, the location of each wireless access point is known and obtainable either from a database on the network or from the access points themselves. The strengths of wireless signals passing between the mobile computer and multiple wireless access points of the network, including the access point with which the mobile computer has established the session, are measured at multiple time intervals. The measurements may be taken at the mobile computer itself or at the wireless access points. The measured strength values are then weighted according to such factors as whether the mobile computer has already established a communication session with the access point from which the sample was taken, and how old the sample is. For each location, the weighted strength values obtained for access points in that location are summed. The location having the highest sum is deemed to be the location of the mobile computer.

In various embodiments of the invention, the location of each wireless access point and consequently, the location of the mobile computer may be expressed in a variety of ways. For example, the location of the mobile computer may be calculated and expressed as a physical location, relative to some reference point, or as part of a grid system established by the system administrator.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and system for determining the location of a mobile computer, in which the strengths of signals passing between the mobile computer and multiple wireless access points of a computer network are measured, either at the client computer itself or at the wireless access points. According to various embodiments of the invention, the measurements obtained for the signal strengths are grouped according to the location of the wireless access points. The measure signal strength values are then weighted according to such factors as whether the mobile computer has established a connection with a wireless access point or how old a measurement is.

Prior to proceeding with a description of the various embodiments of the invention, a description of the computer and networking environment in which the invention may be practiced will now be provided. Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), hand-held devices, multi-processor systems, microprocessor-based programmable consumer electronics, network PCs, minicomputers, mainframe computers and the like. The term "mobile" as used herein may apply to any of these types of computers. Furthermore, the term "client computer" is not meant to be limited to those computers that are in a static client-server relationship. Persons skilled in the art recognize that a computer can function as both a client and a server at various times, and may even serve as both simultaneously in so-called "peer" networks. The invention may also be employed in distributed computing environments, where tasks are performed by remote processing devices that are linked through a communications network. In a distributed computing environment, modules may be located in both local and remote memory storage devices.

Figure 1:
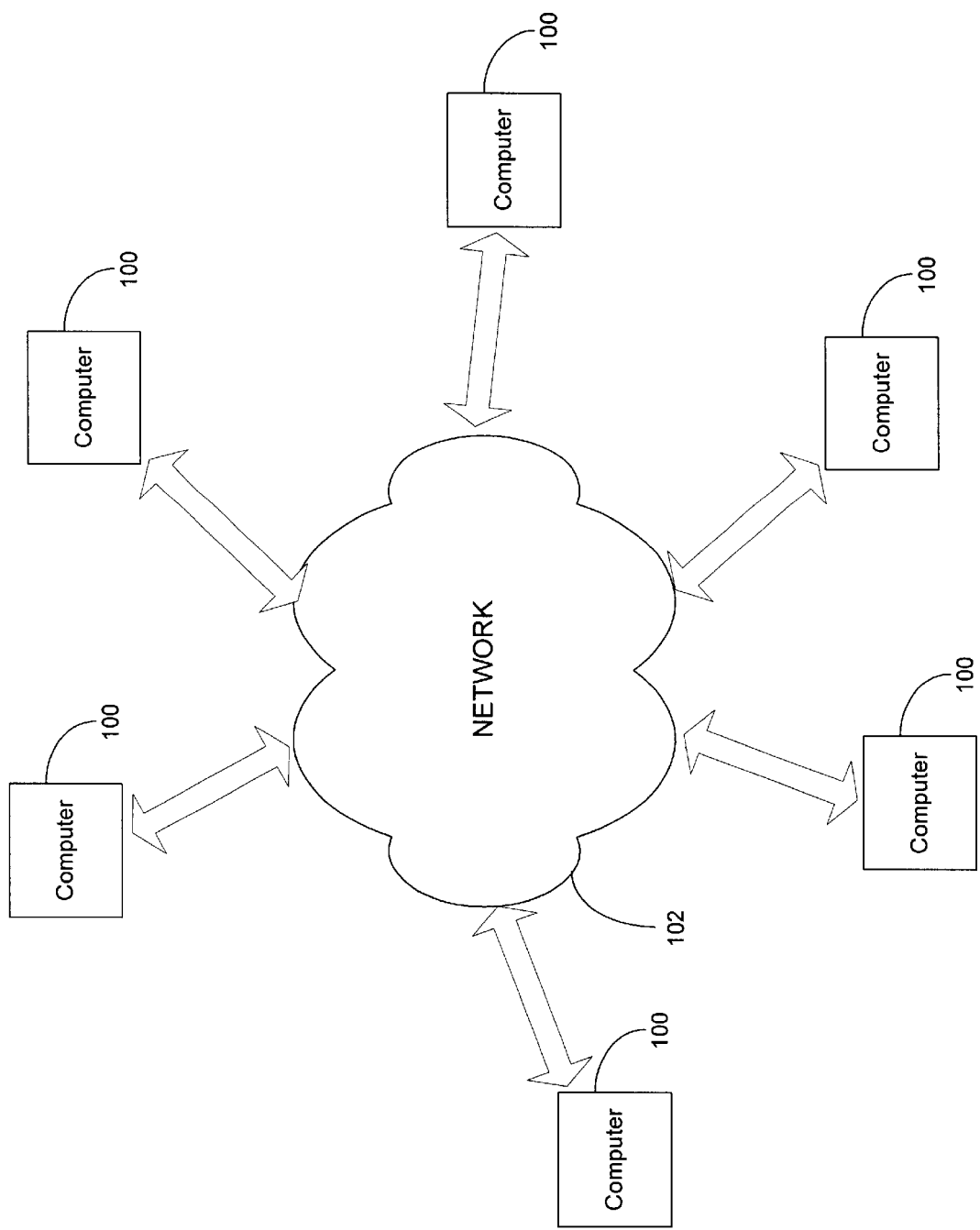
FIG. 1 shows an example of a computer network in which the invention may be practiced.

An example of a networked environment in which the invention may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
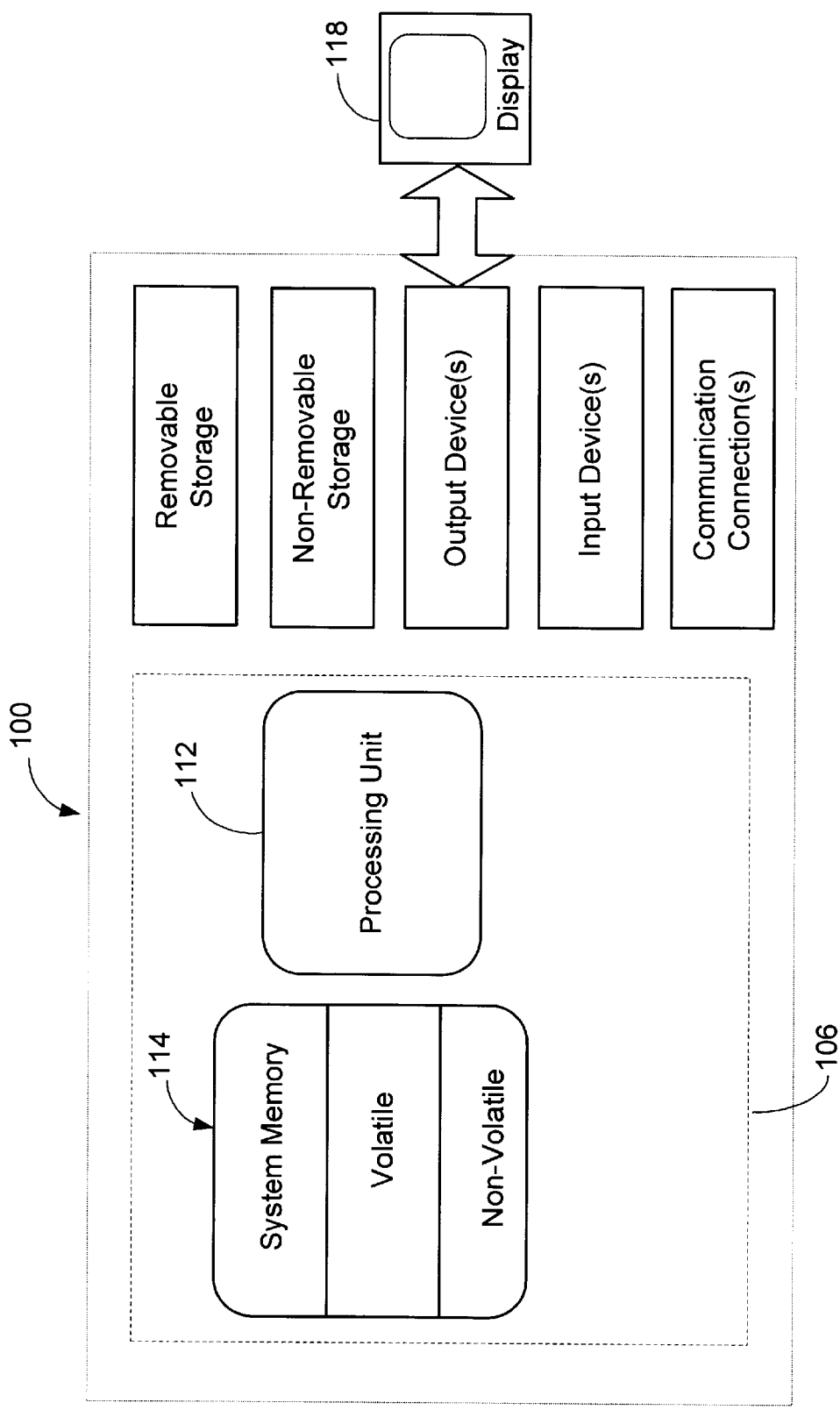
FIG. 2 shows an example of a computer on which at least some parts of the invention may be implemented.

Referring to FIG. 2, an example of a basic configuration for a computer on which at least parts of the invention described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 118, speakers, a printer, etc. may also be included. All these devices are well known in the art and need not be discussed at length here.

Figure 3:
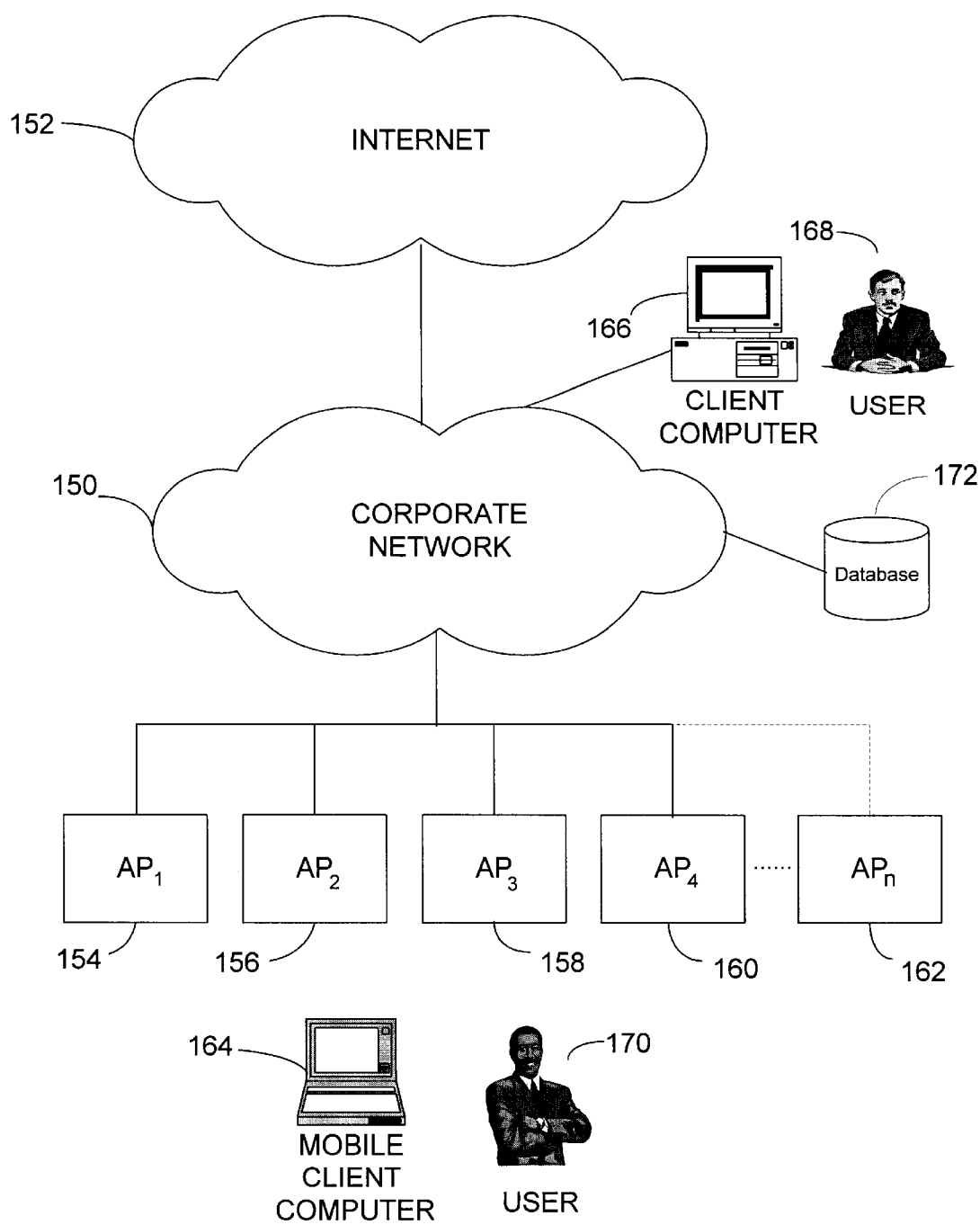
FIG. 3 illustrates an example of a corporate network on which the invention may be implemented.

An example of a scenario in which the invention may be implemented will now be described with reference to FIG. 3, in which a corporate network 150 is communicatively linked to the Internet 152 and includes a first client computer 166, and wireless access points 154, 156, 158, 160 and 162. The first client computer is being used by a first user 168. The wireless access points 154, 156, 158, 160 and 162 are designated as $AP_1$, $AP_2$, $AP_3$, $AP_4$ and $AP_n$. As suggested by the dashed line between $AP_4$ and $AP_n$, there may be any number of wireless access points in the corporate network 150. A second client computer 164 is recognized by the corporate network 150, but is not constantly in communication with the corporate network 150. The second client computer 164 is mobile, and accompanies a second user 170 wherever the second user 170 goes. The second client computer 164 will often be referred to hereinafter as the "mobile client computer 164." To establish communication with the corporate network 150, the mobile client computer 164 establishes a wireless session with one of the wireless access points. The wireless session may be established according to any type of wireless medium, including radio frequency (RF) or ultrasound. The embodiments described herein are known to be suitable for IEEE 802.11b RF communication.

Each wireless access point is located in some location that is associated with a location identifier. There are many ways to implement the location identifier, and the way in which it is implemented depends on how location is to be designated in the network. For example, if the building in which the network is located is to be divided up into a ten-by-ten grid, the location identifier for a wireless access point might look like "0503," indicating that the wireless access point is located in a grid square that is in the fifth row, third column. According to an embodiment of the invention, the location identifier is a character string that includes the building number, floor number and the side of a building (in terms of the compass direction) in which the wireless access point is located. For example, a location identifier that is "Building 2, Floor 3 NW," means that the wireless access point is located in Building 2, on the $3^{rd}$ floor, and in the northwest corner. In other embodiments, the location identifier is a schema that is made up of multiple strings, as in the following example:

Country: Canada
State: BC
City: Victoria
Street: Broad
Street number: 11102
Floor: 2
Room: 115

Two or more wireless access points may have the same location identifier indicating that they are considered to be in the same location according to the location designation scheme implemented for the network.

The location identifier for each wireless access point can be maintained in a variety of places. For example, a database 172 on the corporate network 150 may contain an entry for each wireless access point in the corporate network 150. The entry identifies the wireless access point (by IP address, MAC address and/or machine name, for example) and its location identifier. By customizing the content and the format of the location identifiers in the database 172, a system administrator can set the granularity with which the location of wireless access points on the network 150 is designated. Thus, the location of each wireless access point can be expressed in general terms, such as which floor of a building it located on, or more specific terms, such as which two-meter grid square it occupies. In this way, the granularity with which the location of the mobile computer is determined can also be customized. In some embodiments of the invention, the database 172 is implemented as a MICROSOFT ACTIVE DIRECTORY. Each wireless access point may also know its own location identifier. The mobile client computer 164 may, for example, obtain location identifiers for one or more of the wireless access points by requesting them from the corporate network 150 itself. Alternatively, the wireless access points may continually broadcast their own location identifiers, thus eliminating the need for the mobile client 164 to request the information.

Various embodiments of the invention allow the location of the mobile client computer 164 to be determined, thereby allowing, for example, the first user 168 to query the corporate network 150 (via the first client computer 166) regarding the whereabouts of the second user 170, and receive, in response, the location of the mobile client computer 164.

An example of a procedure that may be used to determine the location of a client computer in an embodiment of the invention will now be described with reference to the flowchart of FIG. 4 and to the scenario illustrated in FIG. 3. In this example, it is assumed that the mobile client computer 164 is engaged in a communication session with $AP_1$ that enables it to communicate with the computer network 150. The mobile client computer 164 (FIG. 3) receives signals from wireless access points $AP_1$, $AP_2$, $AP_3$ and $AP_4$, and measures a value for the strength of the signal received from each wireless access point. The signal strength values for the wireless access points are inputs to the procedure (block 178, FIG. 4). The mobile client computer 164 records the calculated strength values for each wireless access point along with the location identifier for each wireless access point (block 180, FIG. 4). The mobile client 164 then weights the strength value of the wireless access point to which it is connected (Block 182, FIG. 4). Weighting this value is based on the assumption that, in general, mobile client computers are more likely to establish a communication session with wireless access points that are close to them. In this example, the value of the signal strength for $AP_1$ is weighted.

Figure 4:
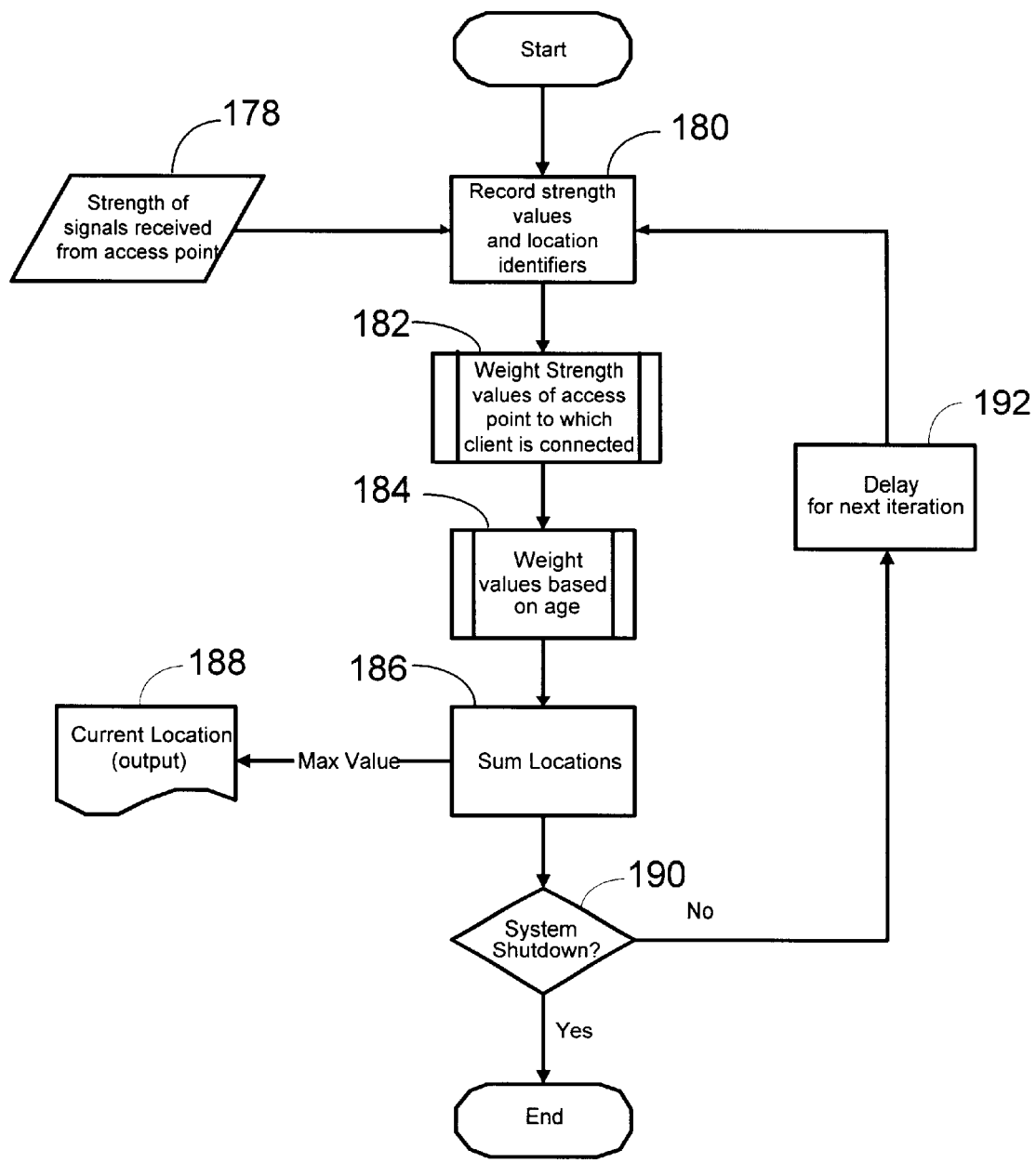
FIG. 4 illustrates a general procedure that may be followed in an embodiment of the invention.

The mobile client computer 164 then weights the strength values based on how much time has elapsed since they were taken, such that the most recently taken values receive the most weight, and the least recently received values receive the least weight (block 184, FIG. 4). Weighting strength values in a manner that is inversely proportional to their age compensates for the possibility of changed conditions, such as the user moving the mobile client computer. Next, the mobile client computer 164 sums the weighted strength values, (block 186, FIG. 4). The summation is performed by location, with multiple access points being averaged. For example, if $AP_1$ and $AP_2$ are in the same location (i.e. they have the same location identifier), their respective weighted strength values are averaged. The location identifier for which the maximum summed value is obtained is deemed to be the location of the client computer (block 188, FIG. 4). This location may be expressed as, for example, a physical location, as a relative location, or according to a grid-type system. For example, one way in which to designate location in a corporate facility would be to divide the facility up by building, by floor and by quadrants on each floor. Assume that $AP_1$ and $AP_2$ are both in Building 1, $1^{st}$ floor, north side; $AP_3$ is on the $1^{st}$ floor, south side; and $AP_4$ is on the $1^{st}$ floor, southeast corner. If the weighted summation for $1^{st}$ floor, north side (the averaged total for $AP_1$ and $AP_2$) is higher than that of the south side ($AP_3$) and southeast corner $AP_4$, the mobile client computer 164 is deemed to be on the $1^{st}$ floor, north side. The mobile client computer 164 repeats the steps represented by blocks 178–186 of FIG. 4 after a preset delay period (block 192, FIG. 4) until it shuts down (block 190, FIG. 4).

According to some embodiments of the invention, the mobile client computer 164 keeps a moving window of signal strength measurements. For example, it may, upon obtaining a preset number of measurements from each of the wireless access points, discard the oldest measurement after each iteration. For example, if the preset number of measurements is ten, then the mobile client computer 164 will, on the iteration following the tenth measurement and on each succeeding iteration, discard the oldest measurement.

Although the procedure of FIG. 4 is described as being carried out by the mobile client computer 164, persons of skill in the art will recognize that all or parts of the procedure could alternatively be carried out on any of the wireless access points 154–162 or on a wireless network interface card coupled to the mobile client computer 164.

An example of how the general procedure described in conjunction with FIG. 4 may be implemented according to an embodiment of the invention will now be described. Referring to FIG. 3, the mobile wireless client computer 164 is assumed to have already established a communication session with wireless access point $AP_1$, and is communicating with the corporate network 150 through the wireless access point $AP_1$. To calculate its own location, the mobile client computer 164 identifies each wireless access point within range. There are various ways that this can be done. In one implementation, the wireless access points each periodically broadcast their IP and/or MAC addresses, which are detected by the mobile client computer 164. The mobile client computer 164 then queries the corporate network 150 for the location identifiers corresponding these IP and/or MAC addresses. The corporate network 150 then retrieves the location identifiers from the database 172 and transmits them to the mobile client computer 164 via the wireless access point $AP_1$. In another implementation, the mobile client computer 164 obtains the location identifiers directly from the wireless access points, which periodically broadcast them or broadcast them in response to a query from the mobile-client computer 164.

The mobile client computer 164 then takes samples of the signals it receives from the wireless access points $AP_1$, $AP_2$, $AP_3$ and $AP_4$. At this point four constants used in this embodiment will be introduced.

| Constant | Bound | Default | Description |
|---|---|---|---|
| k | $\geq 0$ | 1.175 | Weight given to the associated AP wireless access point to which the mobile client computer has established a communicate session. |
| s | >0 | 5 | Number of seconds between sampling iterations |
| t | >0 | 8 | Number of s second iterations to keep history of samples numbered 0 . . . t-1 |
| min | <0 | −100 | Minimum threshold signal strength for wireless access point to be considered |
| j | 0 . . . t-1 | 0 . . . 7 | Index number for samples. The first sample is indexed as 0, the second is 1 and so on . . . j is reset to 0 after j is reaches t-1 |

The mobile client computer 164 first measures the strength, in dBM (decibels relative to one milliwatt), of the signals it receives from each wireless access point, and records the measured values. To help illustrate this implementation, a group of sample values is shown in Table 1, in which t=4, min=−30 and k=2.

TABLE 1

|  | j=0 | j=1 | j=2 | j=3 |
|---|---|---|---|---|
| $AP_1$ $1^{st}$ Floor NW | −21 | −22 | −25 | −29 |
| $AP_2$ $1^{st}$ Floor NE | −31 | −25 | −33 | −31 |
| $AP_3$ $1^{st}$ Floor SW | −19 | −18 | −19 | −17 |
| $AP_4$ $1^{st}$ Floor SE | −17 | −18 | −18 | −19 |

The mobile client computer 164 then effectively disregards all measurements less than min by setting the values of such measurements equal to min. It then modifies the measured strength value for each sample by the absolute value of the difference between min and the measured signal strength or: |min—measured signal strength|. The modified values are shown in Table 2.

TABLE 2

|  | j=0 | j=1 | j=2 | J=3 |
|---|---|---|---|---|
| $AP_1$ 1st Floor NW | \|−30 + 21\| = 9 | \|−30 + 22\| = 8 | \|−30 + 25\| = 5 | \|−30 + 29\| = 1 |
| $AP_2$ 1st Floor NE | \|−30 + 30\| = 0 | \|−30 + 25\| = 5 | \|−30 + 30\| = 0 | \|−30 + 30\| = 0 |
| $AP_3$ 1st Floor SW | \|−30 + 19\| = 11 | \|−30 + 18\| = 12 | \|−30 + 19\| = 11 | \|−30 + 17\| = 13 |
| $AP_4$ 1st Floor SE | \|−30 + 17\| = 13 | \|−30 + 18\| = 12 | \|−30 + 18\| = 12 | \|−30 + 19\| = 11 |

For the samples taken from the wireless access point with which the mobile client computer 164 is associated, $AP_1$ in this example, the values obtained are weighted by k. The results are shown in Table 3.

TABLE 3

|  | j=0 | j=1 | j=2 | j=3 |
|---|---|---|---|---|
| $AP_1$ 1st Floor NW | 2(9) = 18 | 2(8) = 16 | 2(5) = 10 | 2(1) = 2 |
| $AP_2$ 1st Floor NE | 0 | 5 | 0 | 0 |
| $AP_3$ 1st Floor SW | 11 | 12 | 11 | 13 |
| $AP_4$ 1st Floor SE | 13 | 12 | 12 | 11 |

Each sample value is then weighted by a factor of the age of the sample. The general from for this weight is $$\frac{(t-j)}{\sum_{i=1}^{t} i}$$

Since t=4 in this example, the denominator evaluates to 1+2+3+4=10. The weighted values are shown in Table 4:

TABLE 4

|  | j=0 | j=1 | j=2 | j=3 |
|---|---|---|---|---|
| $AP_1$ 1st Floor NW | 4(18)/10 = 7.2 | 3(16)/10 = 4.8 | 2(10)/10 = 2 | 1(2)/10 = 0.2 |
| $AP_2$ 1st Floor NE | 4(0)/10 = 0 | 3(5)/10 = 1.5 | 2(0)/10 = 0 | 1(0)/10 = 0 |
| $AP_3$ 1st Floor SW | 4(11)/10 = 4.4 | 3(12)/10 = 3.6 | 2(11)/10 = 2.2 | 1(13)/10 = 1.3 |
| $AP_4$ 1st Floor SE | 4(13)/10 = 5.2 | 3(12)/10 = 3.6 | 2(12)/10 = 2.4 | 1(11)/10 = 1.1 |

If the mobile client computer 164 has not yet been able to observe t sampling periods, then the age-based weight should be based on the number of observations received thus far. As more samples are recorded, the weights change for each sampling period, until t samples have been received.

The mobile client computer 164 then sums strength values for the samples obtained from wireless access points having the same location identifiers. In this example, each wireless access point has a different location identifier, and the summed weighted values are shown in Table 5.

TABLE 5

|  | j=0 | j=1 | j=2 | j=3 | Sum |
|---|---|---|---|---|---|
| $AP_1$ 1st Floor NW | 7.2 | 4.8 | 2 | 0.2 | 14.2 |
| $AP_2$ 1st Floor NE | 0 | 1.5 | 0 | 0 | 1.5 |
| $AP_3$ 1st Floor SW | 4.4 | 3.6 | 2.2 | 1.3 | 11.5 |
| $AP_4$ 1st Floor SE | 5.2 | 3.6 | 2.4 | 1.1 | 12.3 |

The mobile client computer 164 then determines which of the summed values is the highest, and deems itself to be located in the location having the highest summed value. In this example, the highest summed value is 14.2; which corresponds to $AP_1$. $AP_1$ has a location identifier of "1st floor NW." The mobile client computer 164, therefore deems itself to be located in the northwest section of the first floor. The mobile client computer 164 returns this information to the corporate network 164, which can provide it to a user of the network.

Figure 5:
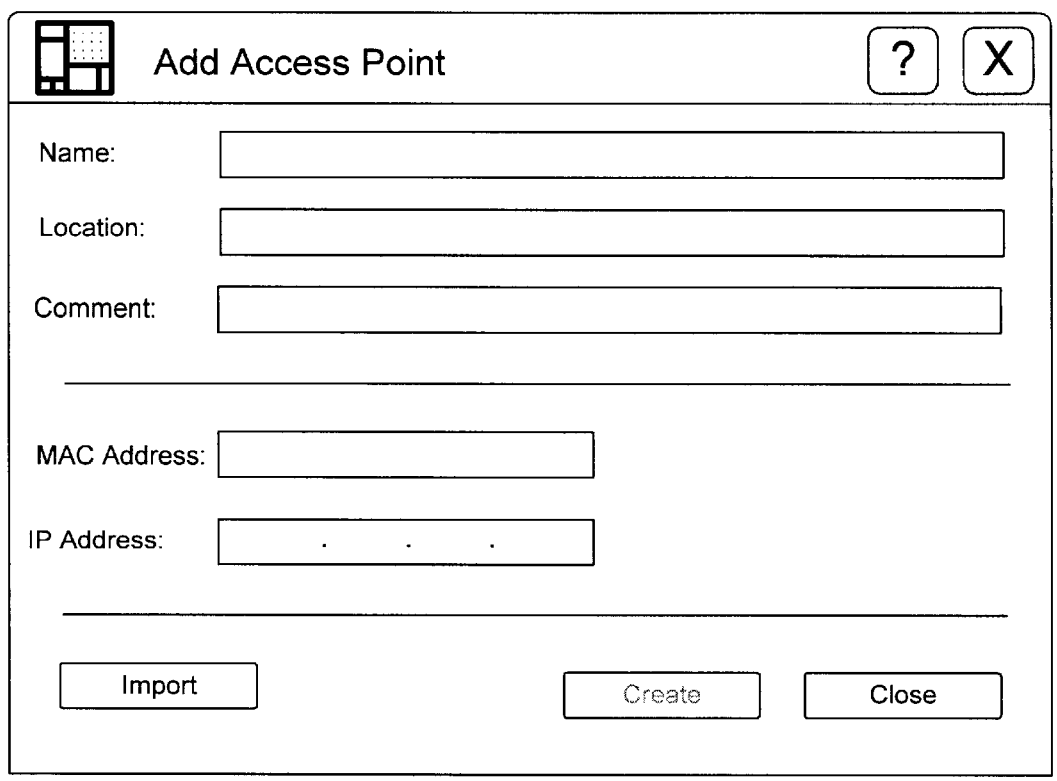
FIG. 5 illustrates an example of a user interface that allows a network administrator to enter information regarding wireless access points of a network.

In various embodiments of the invention, information regarding the wireless access points of a network is entered into central database of the network as the wireless access point is being set up. Referring to FIG. 5, an example of a interface that a network administrator can use to enter the information during set up will now be described. The interface has several entry fields, including a name field, a location field, a comment field, a MAC address field, and an IP address field. An administrator can enter the following data in these fields:

Name: The name associated with this access point.
Location: The location of the access point used by the location algorithm.
Comment: Administrator comment.
MAC Address: Assigned hardware address of the access point.
IP Address: Assigned IP address of the access point. Input control acts identically to IP address input in the TCP/IP network properties dialog.

Once Name, Location, Comment, and at least one of either MAC Address or IP Address is entered, the Create button should be enabled. After pressing Create, the values are added to the database and the contents of the form are cleared.

If the administrator enters anything into the dialog and then presses Close, the user should be asked if they'd like to discard changes. An answer of Yes closes the dialog, while an answer of No returns the user to the dialog.

The Import button displays a standard windows file open dialog with support for import file type masks enabled, such as "Comma Delineated Text File (*.txt)." After selecting a file, the database imports the information in the file and automatically closes the Add Access Point dialog box.

In yet another implementation, the method and system described herein additionally determines how far from a wireless access point a mobile client computer is. This is accomplished by taking one of the signal strength value samples and applying the Power Law to derive the radial distance from the wireless access point. The Power Law can be expressed as follows:

$$P_{signal} P_{known\ point} = \left(\frac{d}{d_{known\ point}}\right)^{-r}$$

where $P_{signal}$ is the power of the signal received by the mobile client computer from the wireless access point, $P_{known\ point}$ is the power of the signal generated by the wireless access point, $d_{known\ point}$ is the distance to the access point, and d is the distance to the mobile user. The term r is a constant whose value is generally considered to be four (4) for indoor communication and two (2) for outdoor communication.

It can thus be seen that a new and useful method for determining the location of a mobile computer has been provided. In addition to the many features of the various embodiments described herein, the invention eliminates the need to use such costly schemes as satellite positioning systems, such as the Global Positioning System (GPS).

In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for determining the location of a client computer, the client computer having an existing wireless communication session with a wireless access point of a computer network, the method comprising:

measuring the strength of signals received from a plurality of wireless access points of the computer network, including the wireless access point to which the client computer has established the existing wireless communication session, wherein each wireless access point is located at one of a plurality of locations, and each of the plurality of locations has one or more of the plurality of wireless access points;

repeating the measuring step to obtain a plurality of signal strength values from each of the plurality of wireless access points;

calculating the difference between each signal strength value and a threshold value to obtain a plurality of modified signal strength values for each of the plurality of wireless access points;

summing the modified signal strength sample values for each of the plurality of locations to obtain a plurality of summed values, each of the plurality of summed values corresponding to a location of the plurality of locations;

determining which of the plurality of summed values is the highest; and designating the client computer to be located near the location for which the summed value is determined to be the highest.

2. A computer-readable medium having stored thereon computer-executable instructions for performing the method of claim 1.

3. The method of claim 1, further comprising:

weighting the summed value of the location having the wireless access point with which the client computer has established the existing wireless communication session, wherein the determining step is performed after the weighting step.

4. The method of claim 1, further comprising, prior to execution of the summing step, weighting each signal strength value by a factor that is inversely proportional to the time elapsed since the signal strength value was measured.

5. The method of claim 1, further comprising, prior to execution of the summing step, weighting each signal strength value such that the more time that has elapsed since the signal strength value was measured, the less weight the signal strength value receives.

6. The method of claim 1, wherein the calculating step comprises calculating the absolute difference between each signal strength value and the threshold value to obtain the plurality of modified signal strength values for each of the plurality of wireless access points.

7. The method of claim 1, further comprising determining the location of each of the plurality of wireless access points based on a location string received from each of the wireless access points.

8. The method of claim 1, wherein the measuring step is repeated over a time interval, the method further comprising, prior to execution of the summing step, weighting each signal strength value by a factor that is based on the difference between the number of time units that elapsed in the time interval when that the signal strength value was taken and the total number of time units in the time interval.

9. The method of claim 1, wherein the designating step further comprises estimating, based on the strength of the signal received from a wireless access point in the location in which the client is designated to be located, the radial distance between the client and the wireless access point.

10. The method of claim 1, further comprising informing a user of the network that the user of the client computer is in the location in which the client computer has been designated to be located.

11. The method of claim 10, further comprising:

receiving from the user of the network an inquiry as to where the user of the client computer is located; and performing the informing step in response to the inquiry.

12. The method of claim 1, wherein each of the steps is performed without the use of a satellite positioning system.

13. The method of claim 1, further comprising discarding the oldest signal strength value from at least one of the access points.

14. The method of claim 1, wherein at least one of the steps is performed by a network interface card coupled to the client computer.

15. The method of claim 1, wherein at least one of the steps is performed by one or more of the plurality of wireless access points.

16. The method of claim 1, wherein at least one of the locations has a plurality of wireless access points, the method further comprising:

averaging the modified signal strength values obtained for all of the plurality of wireless access points of the at least one location; and using the averaged value as the summed value for the location.

17. A method for determining the location of a client computer, the client computer having an existing wireless communication session with a wireless access point of a computer network, the method comprising:

measuring the strength of signals received at a plurality of wireless access points of the computer network from the client computer, including the wireless access point to which the client computer has established a communication session, wherein each wireless access point is located at one of a plurality of locations, and each of the plurality of locations has one or more of the plurality of wireless access points;

repeating the measuring step to obtain a plurality of signal strength values from each of the plurality of wireless access points;

calculating the difference between each signal strength value and a threshold value to obtain a plurality of modified signal strength values for each of the plurality of wireless access points;

for each location, summing the modified signal strength sample values that were based on signal strength values obtained from the one or more wireless access points at the location, thereby obtaining a summed value for each location;

weighting the summed value of the location having the wireless access point with which the client computer has a wireless communication session;

after the weighting step, determining which of the summed values is the highest; and designating the client computer to be located in the location for which the summed value is determined to be the highest.

18. A computer-readable medium having stored thereon computer-executable instructions for performing the method of claim 17.

19. The method of claim 17, further comprising, prior to execution of the summing step, weighting each signal strength value by a factor that is inversely proportional to the time elapsed since the signal strength value was measured.

20. The method of claim 17, wherein the calculating step comprises calculating the absolute difference between each signal strength value and the threshold value to obtain the plurality of modified signal strength values for each of the plurality of wireless access points.

21. The method of claim 17, wherein the measuring step is repeated over a time interval, the method further comprising, prior to execution of the summing step, weighting each signal strength value by a factor that is based on the difference between the number of time units that elapsed in the time interval when that the signal strength value was taken and the total number of time units in the time interval.

22. A method for determining the location of a client computer, the method comprising:

measuring the strength of signals received from a plurality of wireless access points of the computer network, wherein each wireless access point is located at one of a plurality of locations, and each of the plurality of locations has one or more of the plurality of wireless access points;

repeating the measuring step to obtain a plurality of signal strength values from each of the plurality of wireless access points;

calculating the difference between each signal strength value and a threshold value to obtain a plurality of modified signal strength values for each of the plurality of wireless access points;

weighting each modified signal strength value by a factor that is inversely proportional to the time elapsed since the signal strength value was measured;

for each location, summing the modified signal strength values that were based on signal strength values obtained from the one or more wireless access points at the location, thereby obtaining a summed value for each location;

determining which of the summed values is the highest; and designating the client computer to be located in the location for which the summed value is determined to be the highest.

23. A computer-readable medium having stored thereon computer-executable instructions for performing the method of claim 22.

24. The method of claim 22, further comprising:

weighting the highest summed value; and performing the determining step after the step of weighting the highest summed value.

25. The method of claim 22, wherein each of the steps is performed without the use of a satellite positioning system.

26. The method of claim 22, further comprising discarding the oldest signal strength value from at least one of the access points.

27. The method of claim 22, wherein at least one of the steps is performed by a network interface card coupled to the client computer.

28. The method of claim 22, wherein at least one of the steps is performed by one or more of the plurality of wireless access points.

29. The method of claim 22, wherein at least one of the locations has a plurality of wireless access points, the method further comprising:

averaging the modified signal strength values obtained for all of the plurality of wireless access points of the at least one location; and using the averaged value as the summed value for the location.

30. A system for determining the location of a user, the system comprising:

a computer network having a plurality of wireless access points, wherein each wireless access point is located at one of a plurality of locations, each of the plurality of locations has one or more of the plurality of wireless access points, each wireless access point broadcasts a location identifier identifying the location in which the wireless access point is located;

a client computer engaged in a wireless communication session with one of the plurality of wireless access points, wherein the user is associated with the client computer, wherein the client computer performs steps comprising:

measuring the strength of signals received from the plurality of wireless access points of the computer network, including the wireless access point to which the client computer has established a communication session;

repeating the measuring step to obtain a plurality of signal strength values from each of the plurality of wireless access points;

calculating the difference between each signal strength value and a threshold value to obtain a plurality of modified signal strength values for each of the plurality of wireless access points;

for each location, summing the modified signal strength sample values that were based on signal strength values obtained from the one or more wireless access points at the location, thereby obtaining a summed value for each location;

weighting the summed value of the location having the wireless access point with which the client computer has a wireless communication session;

after the weighting step, determining which of the summed values is the highest; and transmitting to the computer network the location identifier of the location determined to have the highest summed value.

31. A method for determining the location of a client computer, the method comprising:

establishing a wireless communication session with a wireless access point of a computer network;

detecting wireless signals being broadcast by a plurality of wireless access points of the computer network, including the access point with which a communication session has been established, wherein the signals from each of the plurality of wireless access points comprise a location identifier for the wireless access point, the location identifier being indicative of the location of the wireless access point;

taking samples of the signals from the plurality of wireless access points over a preset number of iterations;

for each of the number iterations, recording the values of the strength of the signal samples and the location identifiers for the access points from which the signal samples originated;

establishing a minimum signal strength value;

disregarding all signal samples whose strength is less than the minimum signal strength value;

modifying the value of the strength of each signal sample by:

weighting the value of the strength of the signal sample by the absolute value of the difference between the minimum signal strength value and the value of the strength of-the signal sample; and weighting the value of the strength of the signal sample by a factor of the age of the signal sample;

if the signal sample was obtained from the wireless access point with which the client computer has established a communication session, further weighting the signal sample;

for each location identifier, summing the modified strength sample values of the wireless access points that are broadcasting that location identifier; and returning the location identifier for which the summed modified strength sample values of the wireless access points having that location identifier is the highest.

32. A computer-readable medium having stored thereon computer-executable instructions for performing the method of claim 31.

33. A system for determining the location of a client computer, the client computer having an existing wireless communication session with a wireless access point of a computer network, the method comprising:

means for repeatedly measuring the strength of signals received from a plurality of wireless access points of the computer network to obtain a plurality of signal strength values from each of the wireless access points, including the wireless access point to which the client computer has established the existing wireless communication session, wherein each wireless access point is located at one of a plurality of locations, and each of the plurality of locations has one or more of the plurality of wireless access points; and means for obtaining the signal strength values from the measuring means, calculating the difference between each signal strength value and a threshold value to obtain a plurality of modified signal strength values for each of the plurality of wireless access points, summing the modified signal strength sample values for each of the plurality of locations to obtain a plurality of summed values, and determining the location of the client computer based on which of the plurality of summed values is the highest.

* * * * *

UNITED STATES PATENT AND TRADEMARK OFFICE
CERTIFICATE OF CORRECTION

PATENT NO. : 6,664,925 B1 Page 1 of 1
DATED : December 16, 2003
INVENTOR(S) : Moore et al.

It is certified that error appears in the above-identified patent and that said Letters Patent is hereby corrected as shown below:

Column 13,
Line 44, "of-the" should read -- of the --.

Signed and Sealed this

Thirteenth Day of July, 2004

JON W. DUDAS
*Acting Director of the United States Patent and Trademark Office*